Dec. 18, 1962     A. F. DE LA CALLE     3,069,295
APPARATUS FOR PROCESSING SUGAR CANE
Filed June 20, 1960     3 Sheets-Sheet 1
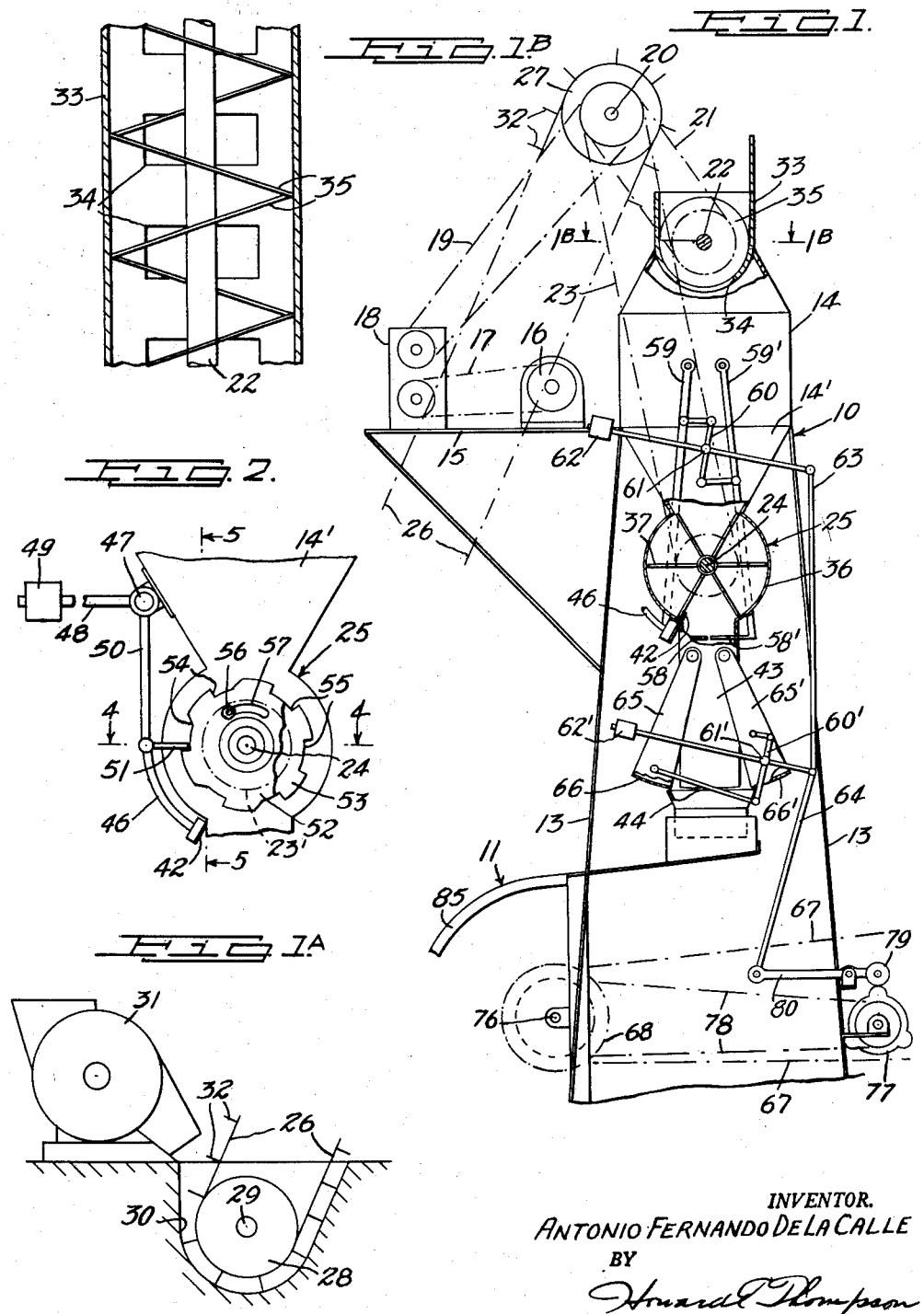
INVENTOR.
ANTONIO FERNANDO DE LA CALLE
BY
ATTORNEY Dec. 18, 1962  A. F. DE LA CALLE  3,069,295
APPARATUS FOR PROCESSING SUGAR CANE
Filed June 20, 1960  3 Sheets-Sheet 2
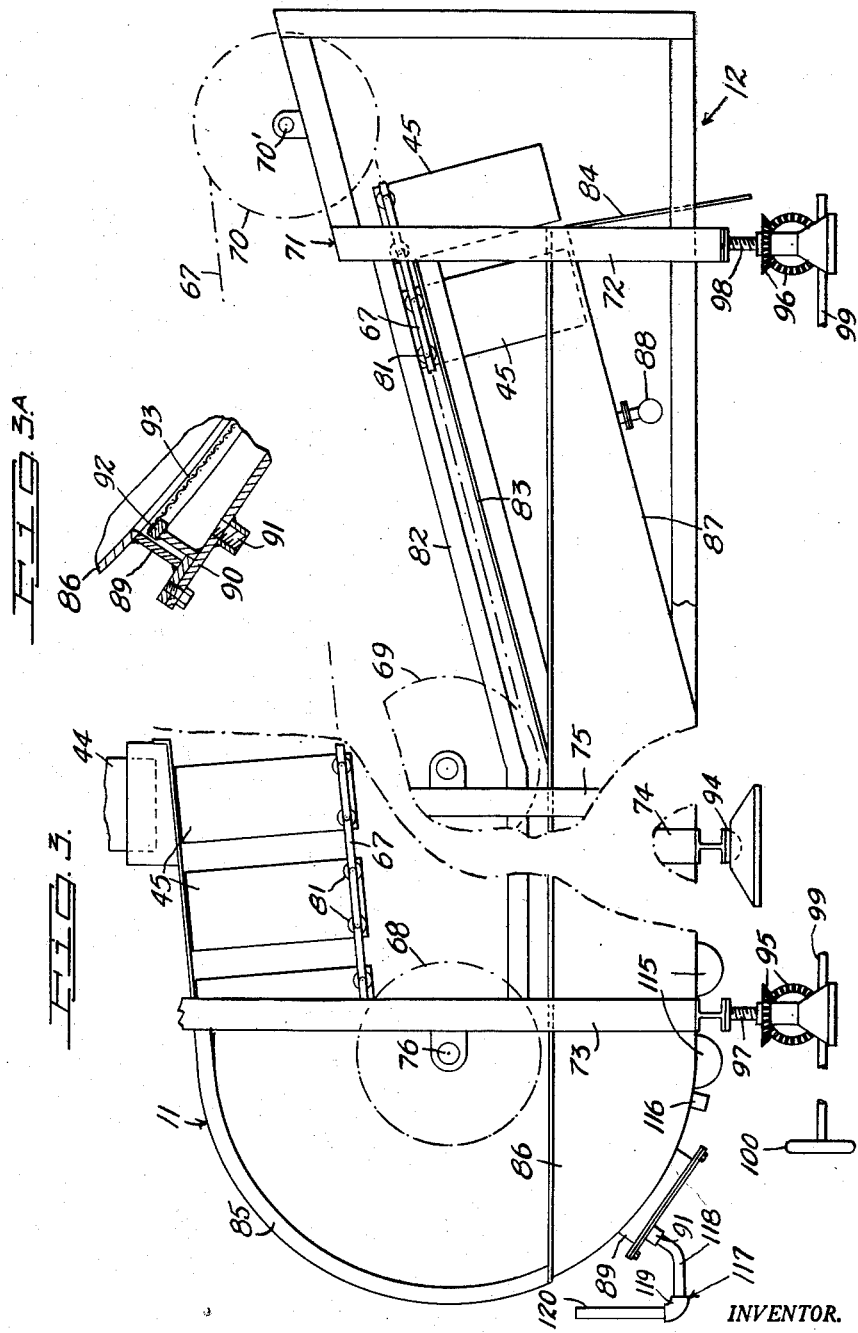
INVENTOR.
ANTONIO FERNANDO DE LA CALLE
BY
  Howard C. Thompson
  ATTORNEY Dec. 18, 1962     A. F. DE LA CALLE     3,069,295
APPARATUS FOR PROCESSING SUGAR CANE
Filed June 20, 1960     3 Sheets-Sheet 3
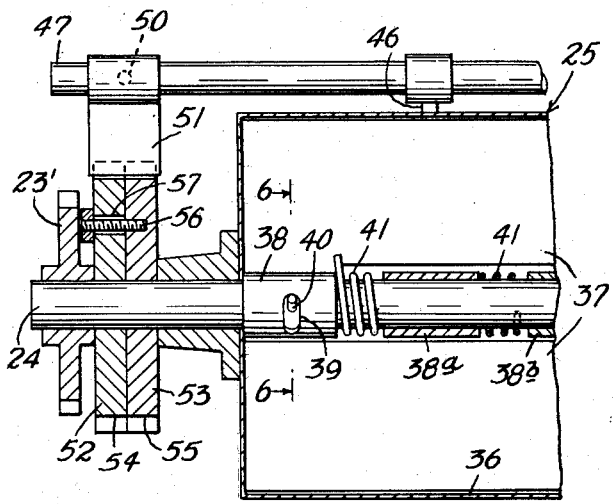
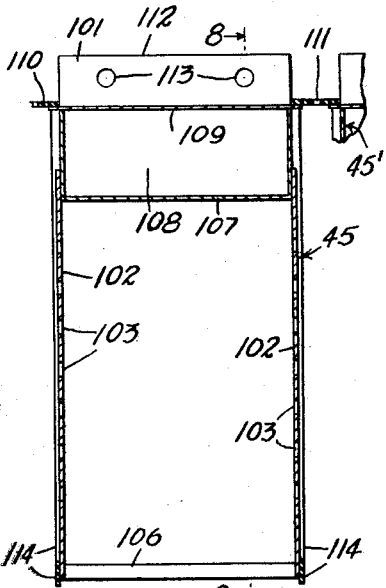
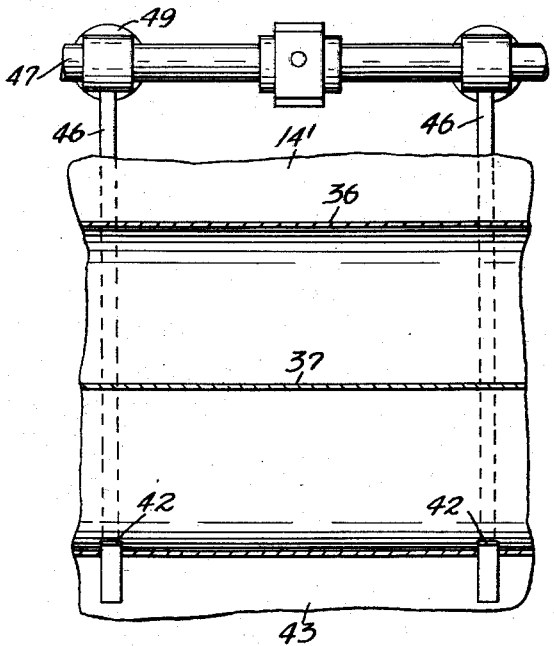
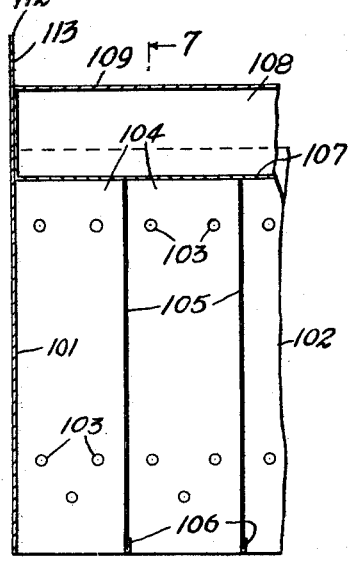
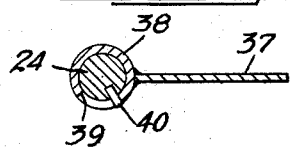
INVENTOR.
ANTONIO FERNANDO DE LA CALLE
BY
ATTORNEY

United States Patent Office 3,069,295
Patented Dec. 18, 1962

3,069,295
APPARATUS FOR PROCESSING SUGAR CANE
Antonio Fernando de la Calle, Sena 51,
Mexico City D.F. 5, Mexico
Filed June 20, 1960, Ser. No. 37,132
17 Claims. (Cl. 127—5)

This invention relates to apparatus for processing and handling sugar cane with controlled delivery of the cane chips to a multiplicity of cells or cane chip conveyor elements arranged upon chains for passage through the tank of a diffuser and discharge of the processed chips from one end portion of the diffuser. More particularly, the invention deals with an apparatus of the character described employing means for synchronizing discharge of the chips with the feed of the conveyor elements through the diffuser for successively depositing the required amount of chips in each element as each element registers with the delivery station of the apparatus.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side view primarily of the delivery station end of the apparatus, with parts of the construction broken away and in section and omitting the showing of the conveyor elements.

FIG. 1A illustrates the lower part of the apparatus associated with the station illustrated in FIG. 1, part of the structure being diagrammatically sectioned.

FIG. 1B is a small sectional detail view on the line 1B—1B of FIG. 1, diagrammatically illustrating the reverse screw feed of the chips.

FIG. 2 is an enlarged detail view of one end portion of the blade feeder diagrammatically illustrated in section in FIG. 1, with parts of the construction broken away.

FIG. 3 is a diagrammatic side view of the diffuser portion of the apparatus, with parts of the construction broken away and illustrating a few of the chip conveyor elements at the delivery station and at the discharge station of the apparatus.

FIG. 3A is an enlarged sectional detail view of part of the strainer discharge portion of the tank of the diffuser.

FIG. 4 is an enlarged sectional view on the line 4—4 of FIG. 2, with parts of the construction shown in elevation and illustrating only one end portion of the apparatus.

FIG. 5 is an enlarged section substantially on the line 5—5 of FIG. 2 and taken at a portion of the apparatus spaced from the end illustrated in FIG. 4 of the drawing.

FIG. 6 is a detail section on the line 6—6 of FIG. 4, illustrating only one blade of the feeder.

FIG. 7 is an enlarged sectional view through one of the cells or cane chip conveyor elements, the section being on the line 7—7 of FIG. 8 and indicating a small portion of an adjacent element; and FIG. 8 is a section on the line 8—8 of FIG. 7 illustrating only one end portion of the cell or element.

My present invention deals with sugar cane processing apparatus employing diffusers generally of the type and kind disclosed in my prior application Serial Number 809,446, filed April 28, 1959, now Patent No. 2,953,485. From this standpoint, detail showings of certain phases of the apparatus are omitted in detail in the present disclosure, except insofar as the diffuser of said prior application has been modified and, from this standpoint, this application can be regarded as a continuation-in-part of said prior application.

The apparatus may be said to comprise a delivery station, generally identified by the reference character 10, 11 will generally identify the processing station employing the diffuser, which station includes at one end the discharge station 12, to which the processed chips are discharged, the stations 11 and 12 being illustrated in FIG. 3 of the drawing.

The delivery station 10, for the most part, may be regarded as a tower-like structure, as diagrammatically illustrated in FIG. 1 of the drawing, arranged above the receiving end portion of the diffuser or station 11. This structure has vertical supports, diagrammatically seen at 13 in FIG. 1, supporting a casing 14 at its upper end. At one side of the casing is a reinforced platform 15, upon which is supported a drive motor 16, with a chain drive 17 to a variable speed drive mechanism 18, from which there is a chain drive 19 to a suitably supported upper drive shaft 20, having a chain drive 21 to a screw feed shaft 22 and a drive 23 to the shaft 24 of a multiple blade rotary feeder, generally identified by the reference character 25.

At 26 is diagrammatically illustrated an endless belt conveyor passing around a drum or the like 27 on the shaft 20 and around another drum 28 on a shaft 29, note FIG. 1A. The shaft 29 and drum 28 are preferably submerged in a suitably constructed pit 30, to which there is a delivery of cane chips from a shredder 31, diagrammatically illustrated in said figure.

The belt conveyor 26 has a multiplicity of spaced transverse blades, diagrammatically seen at 32, for raising the chips to the top of the tower for delivery into a screw feed delivery casing 33, the bottom wall of the casing having a multiplicity of spaced discharges 34, shown in part in FIG. 1B, for delivery of the chips into the casing 14. The casing 14 has a hopper lower end 14' for passage of the chips into the feeder 25.

Considering FIG. 1B of the drawing, here is shown what would be regarded as the central portion of the casing 33 and it will be noted that the blades 35 of the feed screw are such as to feed the chips to both end portions of the casing 30 or what may be termed feeding the same left and right. It might be well to here point out that it will be understood that the entire mechanism of the delivery station 10 has a width substantially comparable to the width of each of the cells or chip conveyor elements, later described, but, in order to simplify the illustration, portions only of the various parts of the apparatus, as well as the cells or elements, only are shown.

The feeder 25 includes a substantially cylindrical casing 36, in which a plurality of blades 37 are rotatably mounted. In FIG. 6 of the drawing, one blade is shown in sectional detail and each blade is welded or otherwise fixed to a plurality of sleeves, one of which is shown at 38 in FIG. 4 of the drawing, the sleeves being mounted on the shaft 24. Each sleeve has an elongated aperture 39 arranged circumferentially on the sleeve, in which a pin 40 fixed to the shaft 24 operates. At 38a I have shown a sleeve of one of the other blades 37 and at 38b a part of the sleeve of a still further blade, note FIG. 4 of the drawing. It will appear from this figure that the sleeves are spaced apart on the shaft 24 and in these spaces are arranged coil springs 41 fixed to the shaft and engaging their respective blades, the purpose of this construction being to allow for continued rotary movement of the shaft 24 after each blade has been held by check fingers 42, note FIGS. 1 and 5. The purpose of this construction is to provide a compression of the cane shreds between the held or check blade and its next adjacent blade, preparatory for controlled discharge of the shredded cane through the discharge casing end 43 of the feeder. This opens into a suitably supported hopper 44 at one end of the station 11 for timely transmission into one of a number of cells or cane chip conveyor elements 45 then positioned beneath the hopper 44, as diagrammatically illustrated at the left of FIG. 3.

The fingers 42 are suitably supported at lower ends of rods 46 fixed to and spaced longitudinally of a pivot shaft 47, note FIG. 5. Also fixed to the shaft 47 is at least one extending rod 48 having a weight 49 at its end portion to normally urge the fingers 42 into operative position. The lower end portions of the rods 46 are curved, as clearly noted in FIG. 2 of the drawing. Also fixed to the shaft 47 at one end thereof is a depending rod 50, note FIG. 2 of the drawing, which supports at the lower end thereof a tripper plate 51 normally supported in the position indicated in FIG. 2 of the drawing to register with and operatively engage two cam discs 52 and 53, the disc 52 having cammed wall notches 54; whereas, the disc 53 has substantially straight wall notches 55. In the showing of FIG. 2, the discs 52 and 53 have been so adjusted as to expose only the notches 54. However, by adjustment of the disc 52 relatively to the disc 53 through the medium of the clamping means 55 and 56 supported on the disc 53 operating in the arc-shaped aperture 57 of the disc 52, the notches 55 can be brought into registration with the notches 54 to reduce the area of the notches and, thus, control the period of time for actuation of the tripper plate 51 to move the fingers 42 into inoperative position, releasing the blades 37 for continued movement of the feeder and the discharge of the cane. In connection with the foregoing, it will be understood that the cam surfaces of the disc 52 facilitate continued rotation of the shaft 24 and automatic outward movement of the tripper plate 51. In practice, disc 53 is fixed or keyed to shaft 24 and disc 52 is rotatable on said shaft.

In discharge from the feeder, I also provide a definite control, so as to synchronize discharge of the cane into each element 45 when properly positioned beneath the hopper 44. In other words, the cane is first momentarily discharged onto a multiplicity of longitudinally spaced fingers 58, 58' diagrammatically illustrated, in part, in FIG. 1 of the drawing movable into and out of the upper end of the casing 43. These fingers are supported at lower ends of levers 59, 59' pivoted to the casing 14 and actuated through a link lever construction, generally identified by the reference 60 which is pivoted, as seen at 61. This structure includes a long rod having a weight 62 at one end and a link 63 coupled with the other end. The weight 62 acts to normally move the fingers 58, 58' into inoperative position. A similar type of linkage 60' is suitably pivoted at 61' and includes a rod having a weight 62' at one end. To the other end of this rod is pivoted the link 63 and another link 64.

The linkage 60' is pivotally coupled with two yoke-shaped members 65, 65' suitably pivoted to the upper portion of the casing 43 and the crossheads of said members 65, 65' form what may be termed gates 66, 66' for normally closing the lower end of the casing 43 to support the cane when discharged from the feeder 25 with the fingers 42 in their inoperative position; whereupon, the members 65, 65' are moved into the position shown in FIG. 1 of the drawing to discharge the cane into one of the elements 45 which would then be positioned beneath the hopper 44 and this positioning of one of the elements 45 is illustrated in FIG. 3 of the drawing. The same has been omitted from FIG. 1 of the drawing in order to avoid duplicate showing and to simplify the present illustration. However, the drive chain construction for conveying the elements 45 is indicated by the dot-dash lines 67 in FIG. 1 of the drawing, the same passing over a sprocket, diagrammatically illustrated at 68 positioned at the receiving end of the station 11. Part of one of the chains 67 is diagrammatically shown at the receiving end and at the discharge end in FIG. 3 of the drawing.

In FIG. 3 of the drawing, the sprocket 68 is also diagrammatically illustrated in dot-dash lines and the two other sprockets controlling the chain drive are indicated at 69 and 70 by dot-dash lines, 69 being in horizontal alinement with 68; whereas, 70 is on a raised platform 71 at the discharge station end 12 of the diffuser.

No attempt has been made to show the details of the framework structure of the apparatus or the diffuser. However, the platform end includes a vertical frame portion 72 and other vertical frame portions 73, 74 and 75, shown in part in FIG. 3 of the drawing, are spaced along the diffuser, 74 being positioned midway between 72 and 73. 73 provides a suitable bearing support for the shaft 76 of the diffuser. The drive of the diffuser is independent of the drive from the motor 16 and at the shaft 70', but timing will be controlled to provide the synchronized operation heretofore referred to. It will also appear, from a consideration of FIG. 1 of the drawing, that the means for positively actuating the fingers 58, 58' and the gates 66, 66' is a cam 77 driven through a chain and sprocket drive, diagrammatically illustrated by the dot-dash lines of the chain at 78 in FIG. 1 of the drawing. The cam 77 operates upon a roller 79 at one end of a pivoted lever 80, the lever being pivotally coupled with the link 64.

It will appear, from a consideration of FIG. 1 of the drawing, that the weights 62, 62' collectively urge the roller 79 at all times in engagement with the cam 77. In the present illustration, the cam has moved the gates 66, 66' into open position and the fingers 58, 58' into closed or operative position. However, when the roller 79 engages the low track of the cam 77, the position of the parts will be reversed, as will be apparent.

Turning now to the diagrammatic showing of FIG. 3 of the drawing, it will appear that on the coupling of the links of the chain 67 are arranged rollers 81. In the lower portion of the diffuser, these rollers operate between upper and lower tracks 82 and 83, the tracks inclining upwardly in the direction of the discharge station where the processed material is discharged from the elements 45 and this discharge is guided to suitable receiving means, not shown, by an angular plate 84 at the station 12. The elements 45, in passing around the sprocket 68, are guided by curved side members, one of which is shown at 85, and then pass into the end of the processing tank 86. This tank extends the full length of the diffuser and, at the discharge end, includes an upwardly inclined bottom wall 87 paralleling the track 83 and extending upwardly to a point meeting the upper end of the plate 84. At 88 I have diagrammatically illustrated the source of the hot water supply to the tank. At the other end of the tank 86 is a discharge housing 89, having a detachable plate 90 with a discharge 91 therein, the plate 90 supporting within the housing 89 on a ring 92 a strainer 93, as illustrated, in part, in FIG. 3A of the drawing. Normally, the level of fluid in the tank 86 is kept reasonably close to the upper open end of the tank and this lever is controlled by regulating the flow of liquid and also by angular adjustment of the diffuser.

This angular adjustment is accomplished through a central partially rotatable pivot portion 94 at the lower portion of the frame 74 and two pairs of bevelled gear units 95 and 96 operating screw jacks 97 and 98 on the frames 73 and 72, respectively. The gears are operated through a single rod 99 having a handwheel 100. The rod 99 has a suitable means, not shown, for driving one of the gears in each of the pairs 95, 96. With this construction, either end portion of the diffuser can be raised or lowered, the diffuser swinging on the pivot 94, as will be apparent.

The showing of the elements 45 are purely diagrammatic in FIG. 3 of the drawing. However, in FIGS. 7 and 8, a more detailed showing of each of these elements is provided. FIG. 7 shows a cross-section through an element substantially on the line 7—7 of FIG. 8; whereas, FIG. 8 is a section on the line 8—8 showing one end portion only of the element. However, in FIG. 7, a small portion of an adjacent element is indicated at 45' for purposes later described. Each element 45 is defined by end walls, one of which is indicated at 101 in FIG. 8 of the drawing, and side walls 102, shown in section in FIG. 7 of the drawing, these walls having apertures 103 therein for free circulation of the fluid through the multiple chambers or compartments 104 of each element, part only of these apertures 103 being illustrated in FIG. 8 of the drawing in order to simplify the showing.

The chambers or compartments 104 are formed by vertical partition walls 105, the lower ends of which are reinforced by inturned portions, as indicated at 106. The partitions are welded or otherwise fixed to the walls 102 and they extend upwardly to the bottom wall 107 of a float casing 108.

Extending upwardly from the bottom wall 107 are side and end walls, to the upper ends of which are welded or otherwise secured a closure plate 109. This plate extends slightly at sides of the elements 45 and forms supports for apertured elastic bands 110 indicated, in part only in FIG. 7 of the drawing. These bands have small apertures 111 therein for discharge of air. In other words, any of the shredded cane which is not delivered directly into each of the elements will be carried down into the tank 86 between adjacent elements and moved through the tank and discharged at the discharge end without interfering in any way with successful and efficient processing of the shredded cane. In other words, the elastic band 110 may be well regarded as an elastic belt, in which end portions of the elements 45 are disposed and the elasticity of this belt will compensate for relative movement of the elements, particularly in passage around the sprockets 68 and 70. The bridging of the belt 110 between adjacent elements is indicated between the element 45 and the element 45' in FIG. 7.

It will be apparent that the end walls 101 of each element project above the float casing 108, as seen at 112 and have apertures 113 therein forming the pivotal support of the chains 67, which are disposed at each end of the elements, as with other devices of this type and kind. In other words, there are two sets of chains and two sets of each of the sprockets 68, 69 and 70. Each element 45 has bordering the side walls thereof yieldable wipers, as at 114, shown only in FIG. 7 of the drawing. These engage the walls of the tank 86 and insure feed of substantially all of the shredded cane through the tank.

In FIG. 4 of the drawing, I have shown in section at 23' the sprocket on the shaft 24, with which the chain 23 operates in the drive of the feeder 25. In this figure, an enlarged section is shown through the cam discs 52, 53 and the engagement of the tripper plate 51 therewith is illustrated.

Spaced along the bottom wall of the tank 86 at least on the straight portion thereof are a plurality of charging casings 115 for charging the fluid contents with heat and air as taught more specifically in my prior application heretofore referred to and at 116 I have diagrammatically illustrated a drain for draining the tank 86, as and when required.

By employing the float casings on each of the elements 45, it will be apparent that these casings will provide a degree of buoyancy of each of the elements in their passage through the tank 86. Normally, these casings will be, for the most part, submerged in the fluid in the tank, this degree of submersion being controlled by the level of fluid maintained in the tank and the angularity of adjustment of the tank through the adjustable means which is employed. By providing elements which open upwardly in the delivery station and, then, downwardly in passage through the tank, the shredded cane itself exposed to the bottom wall of the tank will form a partial skid for free movement through the tank with a minimum amount of energy required for the processing operation. The timing of the feed of the shredded cane to the delivery casing 33 will, of course, be consistent with the discharge into the respective elements 45. The rotary feeder will control the volume of the shredded cane picked up in each compartment between adjacent blades 37. The material so picked up is then placed under the slight compression prior to discharge onto the fingers 58, 58', from which the same is released onto the then closed gates 66, 66', the latter being timely opened for discharge of the cane into the element 45, at which time, the fingers 58, 58' are in operative position, preventing discharge of the material into the casing 43.

Considering FIG. 3 of the drawing, it will be noted that I prefer to use, in conjunction with the discharge 91, a discharge level control 117 which, in the construction shown, consists of a pipe 118 coupled with the discharge 91 and having a rotatable elbow 119 at its end with the discharge pipe proper 120 coupled therewith. In the position shown in FIG. 3, the pipe 120 is at the extreme height of discharge, but by rotating the elbow 119 on the pipe 118, the height of the discharge from the tank 87 can be regulated by varying the position of the discharge end of pipe 120 with respect to the top of the tank.

Having fully described my invention, what I claim as new and desire to secure by Letters Patent is:

1. An apparatus for diffusing sugar cane, wherein coupled chip conveyor elements are moved in one directional lower path through an elongated treatment tank and in an opposite directional upper path above said tank with a delivery station at one end of the tank and a discharge station at the other end thereof characterized by providing elements having apertured side walls transversing the tank in passage of the elements through the tank, one end of each element being permanently closed, and the closed end of each element being positioned at the bottom of the element when traveling in the upper path and at the top of the element in traveling in said lower path.

2. An apparatus as defined in claim 1, further characterized by arrangement of the delivery station above the element where traveling in said upper path.

3. An apparatus as defined in claim 1, wherein the closed end of each element includes a float casing arranged at the upper portion of each element in passage through the tank.

4. An apparatus as defined in claim 3, wherein each element includes partitions extending between the side walls thereof, and said partitions extending from the open end of the element to said float casing.

5. An apparatus as defined in claim 1, wherein the coupling of said elements comprises chains coupled with one end portion of said elements, and a yieldable belt engaging the elements adjacent said chains.

6. An apparatus as defined in claim 5, wherein said yieldable belt includes apertures.

7. An apparatus as defined in claim 2, wherein the delivery station includes means for delivering measured quantities of shredded cane to compartments of each element in passage of said elements through said delivery station, said means including a multiple blade rotary feeder, the space between adjacent blades measuring the quantity of shredded cane for delivery to each element, and means controlling discharge of the measured amount of shredded cane from the feeder to each element.

8. An apparatus as defined in claim 7, wherein the feeder includes a driven shaft, and each blade of the feeder being yieldably coupled with the shaft to provide compression of the shredded cane between adjacent blades of the feeder.

9. An apparatus as defined in claim 8, wherein automatically actuated means is employed operatively engaging each blade in controlling and regulating compression of the cane.

10. An apparatus as defined in claim 7, wherein said control means comprises automatically actuated fingers adjacent the discharge of said feeder, and a pair of automatically actuated gates between said fingers and the element into which the shredded cane is discharged.

11. An apparatus as defined in claim 7, wherein the last named means includes a pair of gates for support of the shredded cane discharged from said feeder, and said gates being automatically actuated for timely discharge of the shredded cane into an element then registering with the opened gates.

12. An apparatus as defined in claim 7, wherein a shredded cane delivery casing is disposed above said feeder, and said casing having a two-way feed screw for discharge of the shredded cane through spaced apertures in the bottom wall of said casing into said feeder.

13. An apparatus as defined in claim 12, wherein a bladed belt conveyor is employed for delivering cane from a shredder to said delivery casing.

14. An apparatus as defined in claim 7, wherein the last named means includes a multiple blade rotary feeder having a discharge into a casing, means yieldably coupling each blade with the drive shaft of said feeder, means comprising a plurality of check fingers adjacent the discharge of said feeder for engaging successive blades of the feeder, and a pair of relatively adjustable cam discs on the drive shaft of said feeder and actuating a tripper plate in controlling movement of said check fingers into inoperative position, releasing the momentarily held blade.

15. An apparatus for diffusing sugar cane, wherein the diffuser includes a delivery station at one end and a discharge station at the opposed end with coupled chip conveyor elements movable in one directional lower path through the diffuser and in an opposed directional upper path above said diffuser characterized by arrangement of the delivery station above the elements where traveling in said upper path, the delivery station employing a multiple blade rotary feeder for delivery of chips to said elements, a shaft for driving said feeder, means yieldably coupling each blade of the feeder with said shaft, means comprising a plurality of check fingers adjacent the discharge of said feeder for engaging and momentarily holding successive blades of the feeder, a pair of relatively adjustable cam discs on said shaft, and a tripper plate operatively engaging said discs in controlling movement of said check fingers into inoperative position releasing the momentarily held blade.

16. An apparatus as defined in claim 15, wherein means is employed between the discharge of said feeder and the elements movable through the delivery station for timely delivery of shredded cane discharged from the feeder into each element positioned beneath said last named means.

17. An apparatus as defined in claim 15, wherein the delivery station includes a delivery casing arranged above and in alinement with said feeder, and a two-way feed screw in said casing for distributing shredded cane in discharge into said feeder.

References Cited in the file of this patent

UNITED STATES PATENTS

| | | |
|---|---|---|
| 2,581,175 | De la Calle | Jan. 1, 1952 |
| 2,953,485 | De la Calle | Sept. 20, 1960 |